(12) United States Patent
Arnold (10) Patent No.: US 7,613,955 B2
(45) Date of Patent: Nov. 3, 2009

(54) COLLECTING DEBUG DATA FROM A WIRELESS DEVICE

(75) Inventor: Baron Arnold, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/326,703

(22) Filed: Jan. 6, 2006

(65) Prior Publication Data

US 2009/0138763 A1    May 28, 2009

(51) Int. Cl.
G06F 9/44 (2006.01)
(52) U.S. Cl. ............................. 714/38; 714/30; 714/43; 717/124
(58) Field of Classification Search ............... 714/30, 714/43, 38; 717/124
See application file for complete search history.

(56) References Cited

U.S. PATENT DOCUMENTS

| | | | |
|---|---|---|---|
| 5,159,592 A | 10/1992 | Perkins | |
| 5,546,447 A | 8/1996 | Skarbo et al. | |
| 5,559,800 A | 9/1996 | Mousseau et al. | |
| 5,579,472 A | 11/1996 | Keyworth et al. | |
| 5,594,910 A | 1/1997 | Filepp et al. | |
| 5,715,387 A * | 2/1998 | Barnstijn et al. | 714/38 |
| 5,727,159 A | 3/1998 | Kikinis | |
| 5,727,202 A | 3/1998 | Kucala | |
| 5,778,176 A | 7/1998 | Geihs et al. | |
| 5,790,974 A | 8/1998 | Tognazzini | |
| 5,802,312 A | 9/1998 | Lazaridis et al. | |
| 5,862,325 A | 1/1999 | Reed et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,339 A | 3/2000 | Agraharam et al. | |
| 6,076,093 A | 6/2000 | Pickering | |
| 6,076,109 A | 6/2000 | Kikinis | |
| 6,134,566 A | 10/2000 | Berman et al. | |
| 6,151,677 A | 11/2000 | Walter et al. | |

(Continued)

FOREIGN PATENT DOCUMENTS

KR            619942 B1 *   9/2006

(Continued)

OTHER PUBLICATIONS

Gonzales et al., "Real-time debugging & wireless devices", Dr. Dobb's Journal; San Mateo: Mar. 2001. vol. 26, Iss. 3; p. 92 (7 pages).*

(Continued)

Primary Examiner—Scott T Baderman
Assistant Examiner—Chae Ko (57) ABSTRACT

A data processing apparatus having a memory for storing program code and a processor for processing the program code, the data processing apparatus comprising: a radio module to communicatively couple the data processing apparatus to a wireless network, the radio module generating a plurality of debug data in a plurality of signal classes; a set of debug data filtering rules specifying certain debug data within the plurality of signal classes to be collected from the radio module; and a debug application executed on the data processing apparatus, the debug application to apply the set of filtering rules, thereby causing only the specified set of debug data to be collected from the radio module.

21 Claims, 5 Drawing Sheets

U.S. PATENT DOCUMENTS

| | | | |
|---|---|---|---|
| 6,157,935 | A | 12/2000 | Tran et al. |
| 6,166,734 | A | 12/2000 | Nahi et al. |
| 6,167,441 | A | 12/2000 | Himmel |
| 6,199,099 | B1 | 3/2001 | Gershman et al. |
| 6,266,400 | B1 | 7/2001 | Castagna |
| 6,282,435 | B1 | 8/2001 | Wagner |
| 6,286,063 | B1 | 9/2001 | Bolleman et al. |
| 6,330,618 | B1 | 12/2001 | Hawkins et al. |
| 6,336,137 | B1 | 1/2002 | Lee et al. |
| 6,370,687 | B1 | 4/2002 | Shimura |
| 6,396,482 | B1 | 5/2002 | Griffin et al. |
| 6,418,310 | B1 | 7/2002 | Dent |
| 6,438,601 | B1 | 8/2002 | Hardy |
| 6,526,274 | B1 | 2/2003 | Fickes et al. |
| 6,557,119 | B1* | 4/2003 | Edwards et al. ............... 714/38 |
| 6,622,175 | B1 | 9/2003 | Piller |
| 2002/0007454 | A1 | 1/2002 | Tarpenning et al. |
| 2002/0010757 | A1 | 1/2002 | Granik et al. |
| 2002/0075305 | A1 | 6/2002 | Beaton et al. |
| 2003/0013483 | A1 | 1/2003 | Ausems et al. |
| 2003/0212926 | A1* | 11/2003 | Bhat et al. ..................... 714/43 |
| 2004/0114741 | A1* | 6/2004 | Ngo et al. .................... 379/133 |
| 2004/0125774 | A1* | 7/2004 | Hoyt ........................... 370/338 |
| 2004/0235520 | A1 | 11/2004 | Cadiz et al. |
| 2005/0053016 | A1* | 3/2005 | Kawai et al. ................. 370/254 |
| 2005/0102362 | A1* | 5/2005 | Price et al. ................... 709/206 |
| 2005/0192002 | A1* | 9/2005 | Varanda ..................... 455/423 |
| 2005/0252249 | A1* | 11/2005 | Miller, III ..................... 66/202 |
| 2006/0007901 | A1* | 1/2006 | Roskowski et al. ......... 370/338 |
| 2006/0184831 | A1* | 8/2006 | Lesartre et al. ................ 714/43 |
| 2006/0234698 | A1* | 10/2006 | Fok et al. .................... 455/425 |
| 2007/0006154 | A1* | 1/2007 | Yang et al. .................. 717/124 |
| 2008/0096543 | A1* | 4/2008 | Sundararajan et al. ...... 455/424 |

FOREIGN PATENT DOCUMENTS

| | | |
|---|---|---|
| WO | WO 98/36344 A2 | 8/1998 |
| WO | WO 00/30003 | 5/2000 |

OTHER PUBLICATIONS

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsing, Digital Library Research Group, College of Library and Information Services University of Maryland, pp. 118-125.

Appenzeller, et al.., "User-friendly Access Control For Public Network Ports", IEEE, pp. 699-707, Mar. 1999.

IBM Technical Disclosure Bulletin, "Multimedia Telephone Caller Recognition" vol. 34, No. 10A, Mar. 1992, pp. 315-316.

* cited by examiner

Crash Log Reports
View Complete Listing or Start Over
(Click for report of radio versions and users.)

| | | | |
|---|---|---|---|
| Last N days | | 7 ▼ | Searches for last N days from right now. Supercedes start/end date. |
| Start Date: | | 12/12/05 12:49 pm | mm/dd/yy hh:mm (am\|pm) |
| End Date: | | 12/19/05 12:49 pm | mm/dd/yy hh:mm (am\|pm) |
| Radio Version | ☐ is not like | 5.061 | leave blank for all, or match partial as in 'c19, c24' |
| OS Version (Full string) | ☐ is not like | | Leave blank to search for all. Enter partial build number to match. Ex: '1.3/75432, 2.1'. |
| Device Build | is equal to ▼ | | Leave blank to search for all. Or match =, !=, <, > . Ex: 64404 |
| User | ☐ is not like | | Leave blank to search for all, single string for LIKE match, or comma sep. list for exact match |
| Error | ☐ is not like | reset | Leave blank to search for all |
| Network | ☐ is not like | | Leave blank to search for all |
| Phone Status | is | ▼ | |
| | | Go! | |

Show Radio Firmware versions
query:
select distinct(error) from radiocrashlog where timestamp >= 187735740 and timestamp <= 188340540 AND LOWER(radio_version) like '%5.061%' and LOWER(error) like '%reset%'

Radio Crashlog Report - 12/12/05 12:49 pm to 12/19/05 12:49 pm)
for the criteria:
Error like "reset"
Radio Version like "5.061"

*Fig. 3*

COLLECTING DEBUG DATA FROM A WIRELESS DEVICE

TECHNICAL FIELD

This application relates generally to the field of data processing systems, and more particularly to collecting debug data from a wireless data processing device.

BACKGROUND

A growing number of computer users today rely on portable, multi-purpose telephony devices such as the "Sidekick" designed by Danger, Inc. of Palo Alto, Calif., and distributed by T-Mobile, Inc. These portable devices may include a variety of messaging, data management and voice capabilities such as, for example, electronic messaging (e.g., Email, IM), personal information management ("PIM") (e.g., contacts, calendar) and standard wireless telephony capabilities.

Given the complexity of the hardware and software used to support these features, a significant amount of time is spent debugging the initial or "beta" versions of these devices. When a particular device crashes, debugging often involves capturing the state of the device at the time of the crash. The state information may include software information, hardware information, network connectivity information or various combinations thereof. Once collected, the state information may be analyzed and compared with the state information from other devices to isolate the source of the problem.

One problem which exists with current debugging techniques, however, is that a vast amount of information may be associated with the current "state" of a device. This is particularly problematic with respect to wireless devices or other types of portable devices in which the bandwidth of the communication channel to the device is limited. Accordingly, more efficient techniques for debugging computing/telephony devices are needed.

SUMMARY

A data processing apparatus is described having a memory for storing program code and a processor for processing the program code, the data processing apparatus comprising: a radio module to communicatively couple the data processing apparatus to a wireless network, the radio module generating a plurality of debug data in a plurality of signal classes; a set of debug data filtering rules specifying certain debug data within the plurality of signal classes to be collected from the radio module; and a debug application executed on the data processing apparatus, the debug application to apply the set of filtering rules, thereby causing only the specified set of debug data to be collected from the radio module.

BRIEF DESCRIPTION OF THE DRAWINGS

A better understanding of collecting debug data from a wireless device can be obtained from the following detailed description in conjunction with the following drawings, in which.

DETAILED DESCRIPTION

Throughout the description, for the purposes of explanation, numerous specific details are set forth in order to provide a thorough understanding of the present embodiments. It will be apparent, however, to one skilled in the art that the present embodiments may be practiced without some of these specific details. In other instances, well-known structures and devices are shown in block diagram form to avoid obscuring the underlying principles of the present embodiments.

Embodiments of a Data Processing Service

Figure 1A:
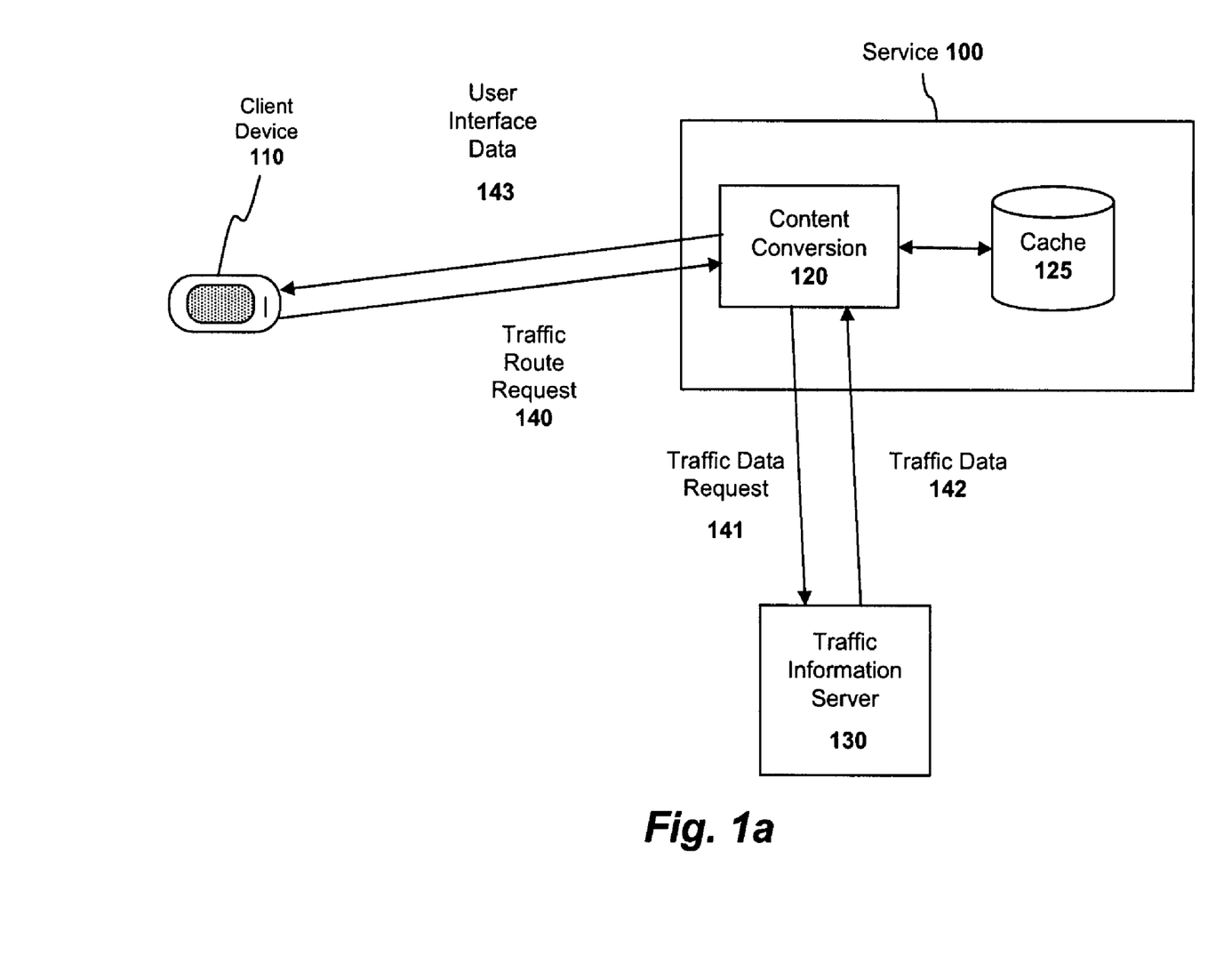
FIG. 1a illustrates a service communicating with a data processing device according to one embodiment of the invention.

Embodiments may be implemented on a wireless device 110 which communicates with a data processing service 100 as illustrated generally in FIG. 1a. Embodiments of a service 100 and data processing device 110 are described in co-pending application entitled NETWORK PORTAL SYSTEM, APPARATUS AND METHOD, Ser. No. 09/714,897, filed Nov. 15, 2000, and SYSTEM AND METHOD FOR INTEGRATING PERSONAL INFORMATION MANAGEMENT AND MESSAGING APPLICATIONS, Ser. No. 10/262,298, filed Sep. 30, 2002 (hereinafter "co-pending applications"), which are assigned to the assignee of the present application and which are incorporated herein by reference. Certain features of the service 100 and data processing device 110 will now be described followed by a detailed description of a multi-mode communication interface for contacting a user and a system and method for dynamically managing presence and contact information. It should be noted, however, that the specific data processing device and system architecture described in the co-pending applications are not required for implementing the underlying principles of the described embodiments. Rather, the embodiments described below may be implemented on virtually any type of data processing device including standard personal computers, personal digital assistants and wireless telephones.

In one embodiment, the service 100 converts standard applications and data into a format which each data processing device 110 can properly interpret. Thus, as illustrated in FIG. 1a, one embodiment of the service 110 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110.

As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Data Processing Device

Figure 1B:
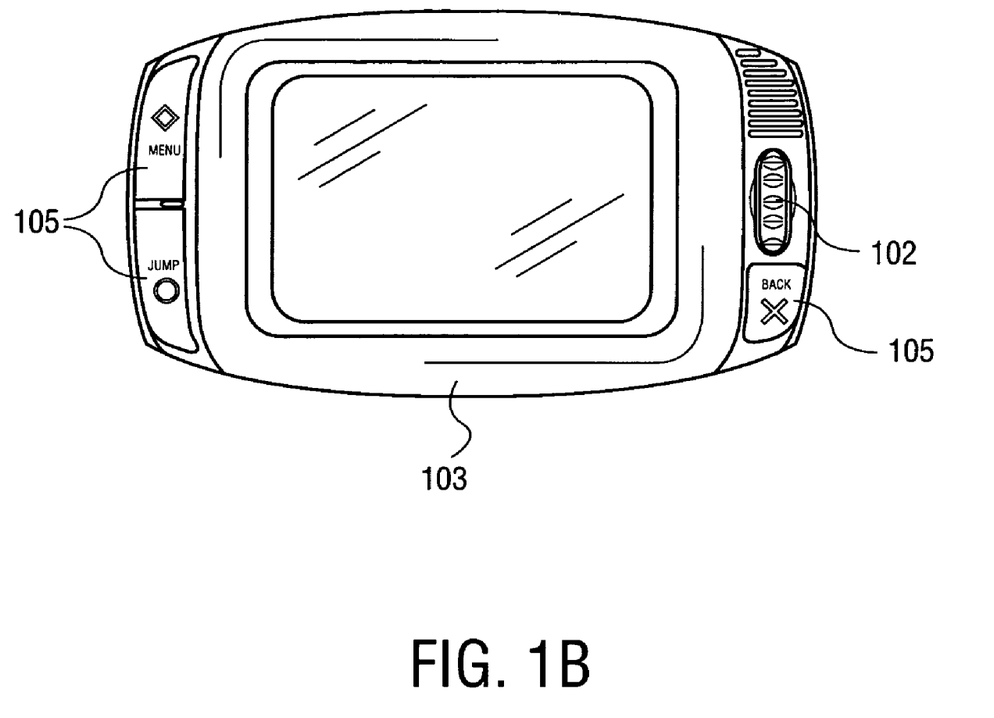
FIGS. 1b-d illustrate a data processing device according to one embodiment of the invention.
Figures 1C, 1D:
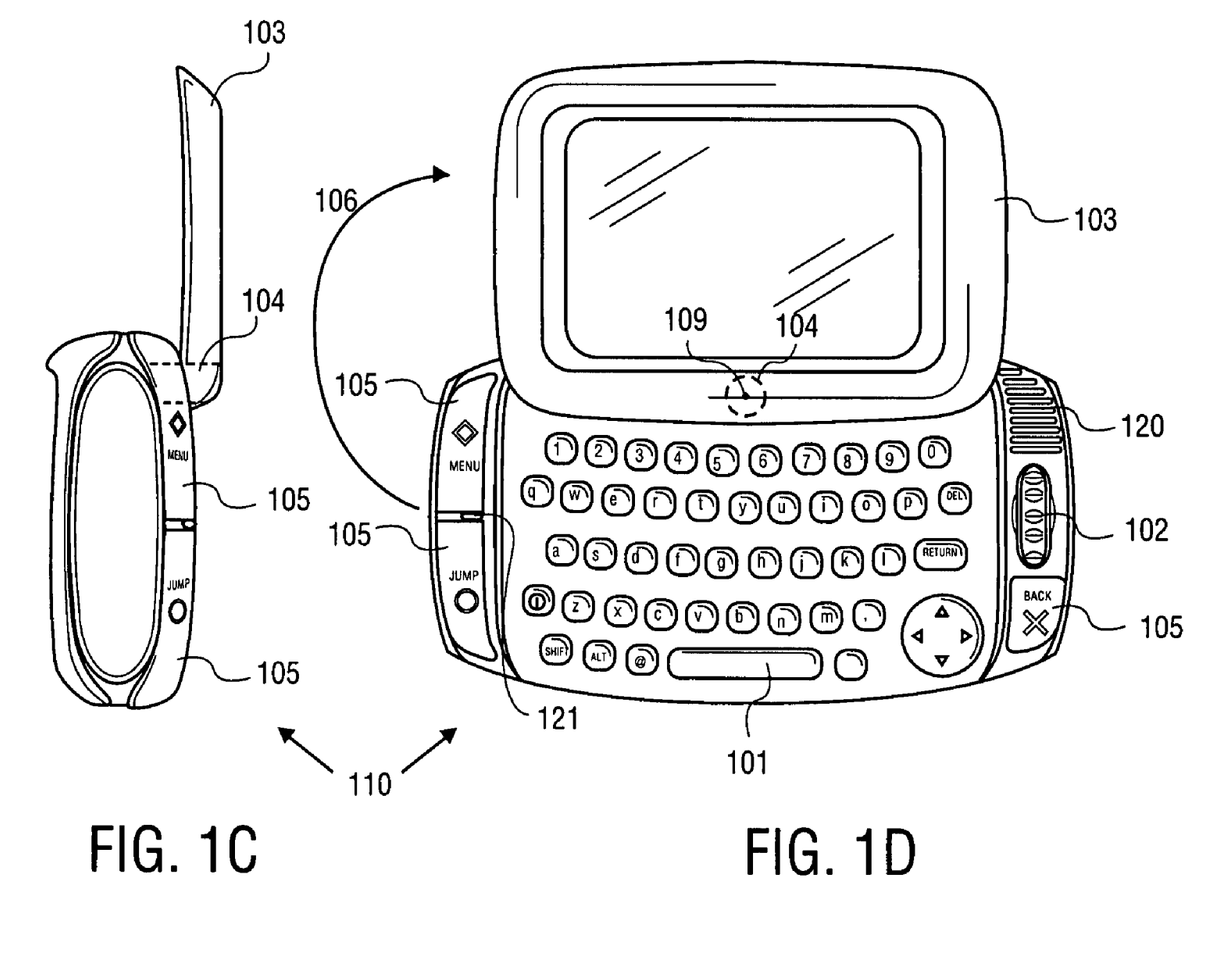

A data processing device on which embodiments are implemented is illustrated in FIGS. 1*b-d*. The data processing device 110 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 110 and pivots around a pivot point 109, located within a pivot area 104, from a first position illustrated in FIG. 1*b* to a second position illustrated in FIGS. 1*c-d*. When in the first position the display 103 covers the keyboard 101, thereby decreasing the size of the device 110 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1*b-c*. As illustrated, when in the second position, the keyboard 101 is fully exposed. Accordingly, the display is viewable, and data is accessible by the user in both a the first position and the second position (although access to the keyboard is only provided in the first position).

In one embodiment, the data processing device 110 is also provided with audio telephony (e.g., cellular) capabilities. To support audio telephony functions, the embodiment illustrated in FIGS. 1*b-d* includes a speaker 120 for listening and a microphone 121 for speaking during a telephone conversation. Notably, the speaker 120 and microphone 121 are positioned at opposite ends of the data processing device 110 and are accessible when the screen 103 is in a closed position and an open position.

Debug Data Collection

Rather than collecting all system information available at the time of a device malfunction, one embodiment of the invention employs advanced filtering techniques to gather only the most relevant debug data. The filtered data is then automatically transmitted back to the service 100 for evaluation. Moreover, in one embodiment, the filtering performed on a particular wireless device may be automatically adjusted based on variables such as the identity of the user (or group of users), the type of problem associated with the wireless device, the version of hardware/software on the wireless device, and/or the state of the wireless device (as described in greater detail below).

Figure 2:
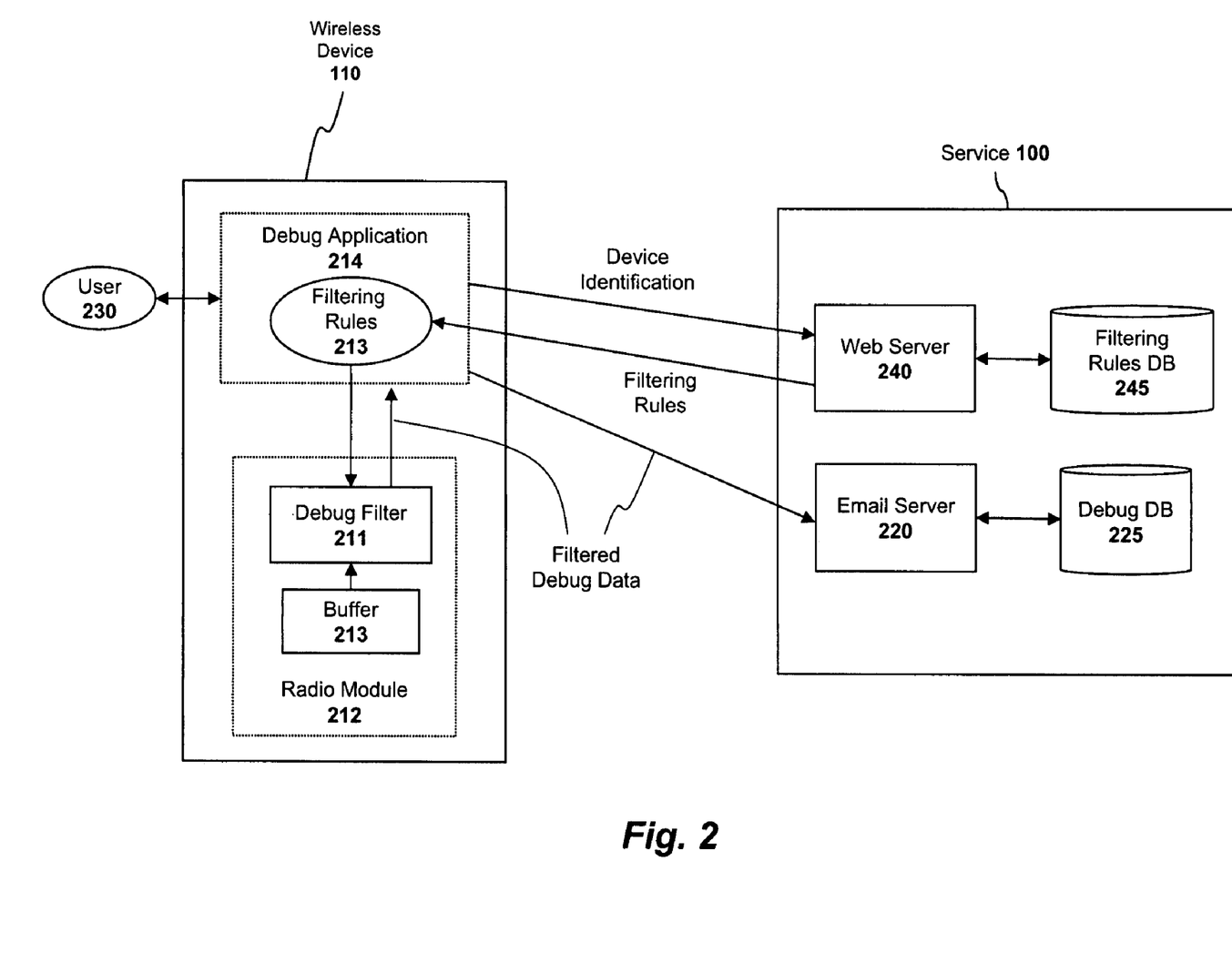
FIG. 2 illustrates a system architecture according to one embodiment of the invention.

FIG. 2 illustrates one embodiment of the invention in which debugging is accomplished via communication between a wireless device 110 and/or a service 100. The wireless device 110 illustrated in FIG. 2 includes a radio module 212 for supporting communication with the service 100 over a wireless network (e.g., a GSM/GPRS network). In this embodiment, the radio module includes a buffer 213 for storing various classes of data related to the operation of the radio module 212 including the current state of communication between the wireless device 110 and the wireless network (details of which are described below).

In addition, this embodiment of the radio module 212 includes debug filtering logic 211 for filtering the data stored within the buffer 213 according to a set of specified filtering rules 213. As illustrated, the filtering rules 213 are specified within the context of a debug application 214 executed on the wireless device 110. In one embodiment, the filtering rules 213 are configured by the end user 230. Alternatively, or in addition, the filtering rules 213 may be uploaded from the service 100, either manually (i.e., in response to a user command) or automatically (i.e., under the control of the debug application 214).

In one particular embodiment, a database of filtering rules 245 is maintained on the service 100. As mentioned above, different filtering rules/templates may be specified for different users/devices or groups of users and/or for different versions of hardware/software used on the wireless device 110. Each time the wireless device 110 is booted up and connected via the wireless network, the debug application 214 transmits a request to a Web server 240 (or other type of server) on the service 100 which is communicatively coupled to the database of filtering rules 245. In one embodiment, the request includes data identifying the wireless device (e.g., a device/user ID code) and is formatted as a standard HyperText Transport Protocol ("HTTP") request (i.e., identifying the Web server with a Uniform Resource Locator ("URL")). It should be noted, however, that the underlying principles of the invention are not limited to any particular communication protocol.

In one embodiment, in response to the request, the Web server 240 queries the database 245 to identify an appropriate set of filtering rules 213 based on the identity of the user and/or the version of hardware/software on the wireless device 110. It then transmits the identified set of filtering rules 213 to the wireless device 110 in the form of an HTTP response. The debug application then applies the filtering rules to the radio module 212 to filter the data maintained within the radio module buffer 211. As a result, the service 100 is capable of dynamically defining the types of debug information to be collected on a user/device basis.

In one embodiment, the debug application 214 continually writes the filtered debug data to a log file (or other non-volatile data structure) so that, if the device crashes/resets, the data will not be lost. In addition, as indicated in FIG. 2, in response to detecting a problematic condition or a manual request, the debug application 214 incorporates the filtered debug data within an email message and transmits the email message to an email server 220 on the service 100. Various formats may be used to incorporate the debug data within the email message such as, e.g., an XML-based text file attached to the email or incorporated within the body of the email messages. In one embodiment, a standard ASCII text format is used at is compressed (e.g., gzipped) to reduce the data.

Figure 3:
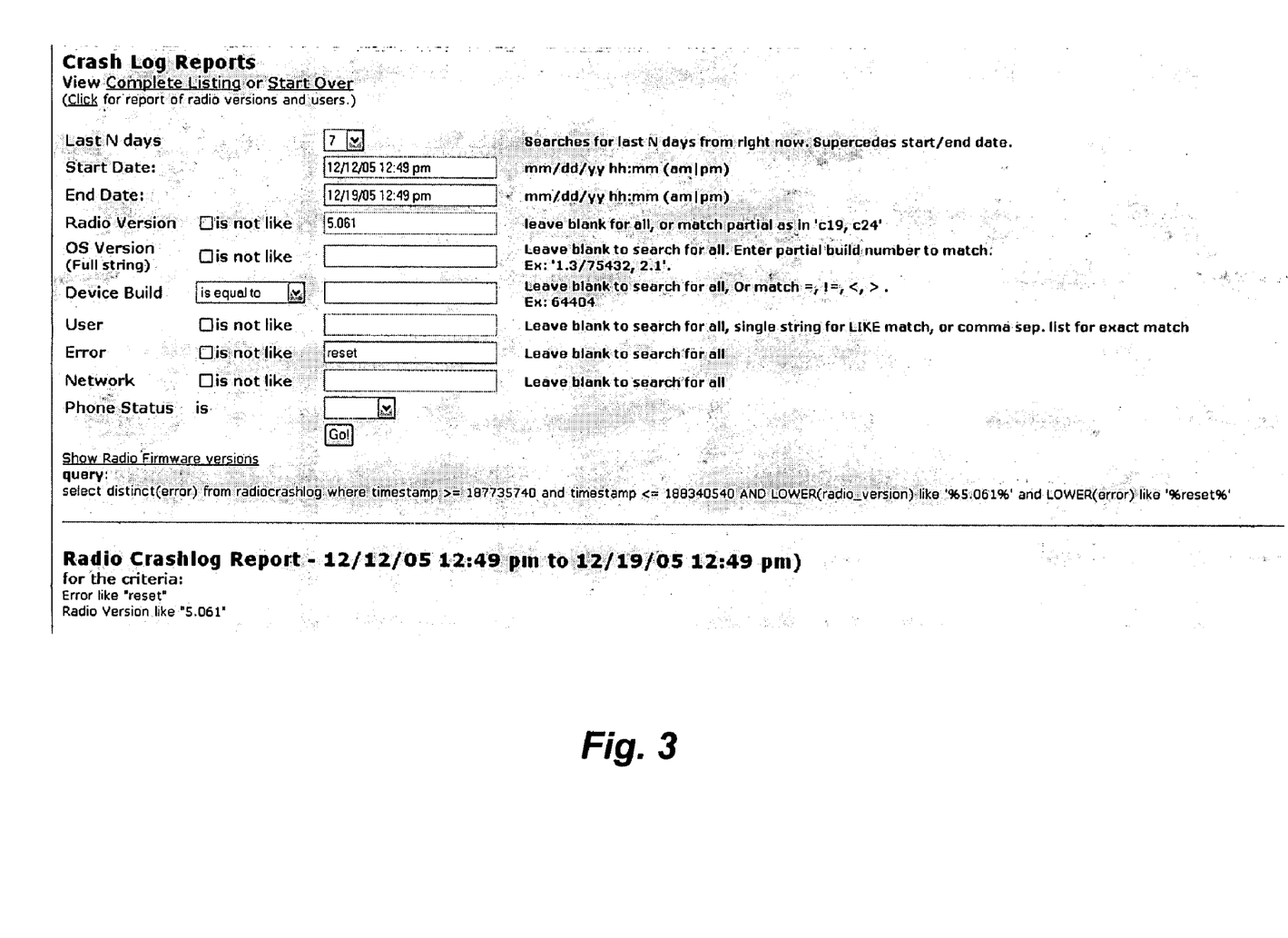
FIG. 3 illustrates an exemplary set of search fields for searching a database containing debug data related to a wireless device.

In one embodiment, a debug database 225 is maintained on the service 100 to store the debug data collected from a plurality of different wireless devices. As such, known problematic conditions may be identified by querying the database 225. For example, if a particular error condition is entered as a search term, a correlation between the error condition and a device software/firmware version may be identified. An exemplary set of search fields for performing searches using date ranges, error conditions, device hardware/software versions, users, network types and other variables is illustrated in FIG. 3. It should be noted, however, that the underlying principles of the invention are not limited to the specific set of variables illustrated in FIG. 3.

In one embodiment, the collected debug data may be used to find and solve connectivity problems between either the wireless device 110 and the radio module 212, the radio module 212 and the wireless network or with any of these parts individually. As used throughout the remainder of this detailed description, lines of debugging text generated by the radio module 212 and filtered by the filtering logic 211 are referred to as "signals." In one embodiment, the signals represent standard GSM/GPRS layer 1-3 classes as defined in the European Telecommunications Standards Institute ("ETSI") standard as well as additional classes used for device/radio serial port communication.

In one embodiment, the following signal classes are generated and/or filtered:

| | |
|---|---|
| RR | Radio Resources |
| GRR | GPRS Radio Resources |
| MM | Mobility Management |
| GMM | GPRS Radio Resources |
| SM | Session Management |
| PL | Physical Layer |
| SMS | Short Message Service |
| MMI | Man/Machine Interface |
| LLC | Logical Link Control |
| SIM | SIM Card Interface |
| SS | Supplementary Services |
| PPP | Point to Point Protocol |
| CC | Call Control |
| DL | Data Link |
| UART | Universal Asynchronous Receiver-Transmitter |

In addition, in one embodiment, each of the foregoing signal classes employs specific classes of messages referred to as "messaging entities" which can be enabled or disabled:

| | |
|---|---|
| PRIMITIVE (PRIM) | Messages may come from three different places. The network, the Operating system and internal. Primitive messages are ones sent between layers and so are considered 'internal' |
| STATE | Layer 1-3 state messages. That is, the STATE that the layer is in at the time of the output. |
| FUNCTION (func) | Additional layer state information. |
| EVENT | Additional layer state information. |
| SYSTEM (SYS) | Radio module system messages such as memory available, system time and trace configuration. |
| ERROR | Radio module system or layer error messages. |
| TIMER | System timer messages internal to the radio module. |
| USER1-USER8 | User-configurable informational messages. |

In addition to these basic signals, in one embodiment of the invention "duplicate" messages can be turned on to provide even more information about what is happening within the radio module 212. As an example, enabling "duplicates" between the classes MM and GMM will display all the messages that are passed between them.

As mentioned above, one embodiment of the wireless device 110 includes a debug application which provides debug filtering rules 213 to the radio module 212. In one embodiment, the filtering logic 211 within the radio module interprets the filtering rules to enable or disable the individual signal class entities mentioned above. In one embodiment, when a filtering command including a set of rules is sent from the debug application 214, the operating system of the wireless device 110 saves this command in an internal location (e.g., Flash memory) so that if the radio module 212 crashes, or is reset manually, the filter setting can be reissued, thereby maintaining all of the previously defined sets of filtering rules.

In one embodiment, filtering rules 213 may be specified via a series of user commands. By way of example, the following is an exemplary command for sending and setting a filter setting to enable the "event," "primitive," "state" and "user1" entity outputs for the signal class MMI:

debugfilter mmi event,prim,state,user1 <return>

In addition, the following is an exemplary command for turning off all output for short message service ("SMS") entities:

debugfilter sms none

In one embodiment, the debug application 214 includes scripting logic (e.g., using JavaScript or a similar style) which may be used to perform various scripting functions on the wireless device 110. In one embodiment, the scripting logic includes hooks into the main operating system of the device 110 so that a user can send filter configurations individually, or as a series via the methods described above. In addition to these individual method calls, the scripting logic can save sets of filters in the device's non-volatile storage (e.g., Flash memory) which may be provided with user-specified or arbitrary names. The filter sets may subsequently be retrieved and sent to the radio. Because the scripting logic of the debug application 214 is a running application, the filter sets may be accessed and dispatched programmatically, allowing for automatic configuration of the radio module 212 output.

By way of example, the following scripting call enables the "event" entity in the "MMI" signal class within the debug filter 211:

setdebugFilter("mmi", "event");

Similarly, the following exemplary scripting call clears all filter settings from the radio module 212:

clearPCOfilters ( );

In one embodiment, each of the messaging entities and signal classes are provided with unique identification codes which may be combined together to form "trace masks" which specify different groups of entities and classes. By way of example, in one embodiment, the debug application 214 is configured with the following entity "trace mask ID's":

| | |
|---|---|
| FUNCTION = | 1 |
| EVENT = | 2 |
| PRIMITIVE = | 4 |
| STATE = | 8 |
| SYSTEM = | 16 |
| ISIG = | 32 |
| ERROR = | 64 |
| CCD = | 128 |

-continued

```
TIMER =                256
USER1 =              65536
```

In one embodiment, sets of messaging entities may be specified by adding the numbers assigned to the respective messaging entities together to form the trace mask. In this way, more than one entity can be represented by a single integer.

In one embodiment, trace masks are used in conjunction with scripting functions to build two internal arrays. The two arrays data are aligned and the trace mask ID's are computed from the list above. For example, the following code may be used to set the "MMI" signal class for "event" and "primitive" messaging entities (i.e., 2 (event)+4 (primitive)=6):

```
    list stuck_on_phone_class
("mmi","l1","gmm","mm","rr","grr","llc", "snd","sm");
    list stuck_on_phone_entity
( 6,   0,   14,   14,   12,   4,   6,   6,   6);
```

In one embodiment, after the two lists have been defined, they may be saved into the non-volatile memory of the wireless device 110 as a set referred to as "stuck_on_phone." For example:

```
savedebugFilterSet("stuck_on_phone", stuck_on-
    _phone_class, stuck_on_phone_entity);
```

After it is saved, the filter set may then be loaded via the debug application 214 into the radio module 212. For example:

```
loaddebugFilterSet("stuck_on_phone");
```

As a result, the debug application will retrieve the filter set 213 from storage and pass it on to the debug logic 211 within the radio.

Moreover, in one embodiment, "Duplicate" messages sets can be saved and retrieved in a similar manner. For example:

```
savedebugDuplicatesSet(duplicateSetName, signal-
    Group, duplicateGroup);

loaddebugDuplicatesSet(duplicatesSetName);
```

One embodiment of the invention uses the following Mask ID's for specifying the Duplicate message sets:

```
gmm =         1
mmi =         2
mm =          4
rr =          8
grr =        16
sm =         32
sim =        64
llc =       128
snd =       256
uart =      512
dl =       1024
ppp =      2048
sms =      4096
ss =       8192
cc =      16384
pl =      32768
```

Returning to the example mentioned above, duplicate messages may be turned on between MM and GMM using the number 5 (MM (4)+GMM (1)=5). In one embodiment, during normal operation, the wireless device 110 will pass through or into any of the following network "states" as it moves in and out of network coverage, the user reboots or removes or inserts a SIM card.

SUSPENDED
GPRS data communication is on hold.
RADIO_OFF
The radio module in the device has been powered down.
INVALID_SIM
The SIM card in the device has been either rejected by the network as invalid, or is malfunctioning in someway.
RADIO_NOT_REGISTERED
The radio module is 'camped' on a foreign network for emergency calls (911) or is in the process of searching for a suitable home or roaming network on which to register.
GPRSATTATCHED
The radio module is registered and attached to a GPRS network.
OBTAINED_IPADDR
The device has been given an IP address by the GPRS network.
LOGIN_TO_SERVER
The device has made contact with the Danger Service, has logged in, and is syncing the application and device settings data.
CONNECTED_TO_SERVER
The device has sucessfully synced all settings and application data.

One embodiment of the invention employs automatic debug filtering based on the current state of the wireless device 110. Specifically, in one embodiment, the debug application 214 is notified any time the network state changes. In response, the debug application 214 modifies the filtering rules 213 applied to the radio module debug filter 211. Thus, filter set changes are implemented based on the current network conditions.

Returning to the "stuck_on_phone" example, the following is an exemplary method call that may be used to automatically load the "stuck_on_phone" filter set whenever the radio reports that it is registered with the GSM network:

```
    setAutotraceConfig("RADIO_REGISTERED",
"stuck_on_phone");
    setDuplicatesConfig("RADIO_REGISTERED",
"stuck_on_phone_duplicates");
```

As mentioned above, in one embodiment, each time the wireless device 110 is booted, the debug application 214 is automatically launched and (potentially) connects to the service 100 and retrieves a set of filtering rules via a Web server 240. More specifically, in one embodiment, when the debug application 214 launches, it initially determines whether "autofiltering" is set to ON. If autofiltering is set to ON, the debug application 214 checks for a URL saved in non-volatile storage (e.g., "filters_url") and uses this URL to retrieve a new set of filtering rules from the Web server 240. The debug application 214 will then cause this new set of filtering rules 213 to be implemented by the debug filter 211. The following are a few examples of how the filtering rules may be implemented.

Variables and if/else statements may be used to customize filters for individual users or sets of users. The following code determines if the username is Baron, and if true, sets the URL to a custom script in which special tracing parameters are defined:

```
    var customScriptURL =
"http://myserver.com/customScript.txt"
    var genericScriptURL =
"http://myserver.com/genericScript.txt"
    if (getUserName( ) == "baron") {
        setSettingString ("filters_url", customScriptURL)
    } else {
        setSettingString ("filters_url", genericScriptURL)
    }
```

The following exemplary code changes filtersets depending on the version of the firmware used within the radio module 212. It is assumed that two different filtersets called "mexico" and "usa" have been saved:

```
if (getRadioFirmwareVersion( ) == "v0.6.0") {
    setAutotraceConfig("GPRSATTACHED", "mexico");
} else {
    setAutotraceConfig("GPRSATTACHED", "usa");
}
```

Finally, in the following example, the size of the debug log stored on the wireless device 110 is set to 1 meg and then a message to standard out is printed:

```
setSettingInt("pco_log_length", 1048576);

netPrint("debug tracing set to 1 meg");
```

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above were implemented within the context of a wireless device, the underlying principles of the invention may be employed on virtually any type of networked computing device. Moreover, although the debug techniques described above focused on collecting data from a radio module, the underlying principles of the invention may be employed to collect data from virtually any hardware/software component of the wireless device 110. Moreover, although described above in the context of "filtering logic" which filters signals from the radio module, in one implementation the radio module is configured by the filtering rules to generate only the desired set of debug data (i.e., rather than generating a full set of debug data which is subsequently filtered).

Accordingly, the scope and spirit of the invention should be judged in terms of the claims which follow.

What is claimed is:

1. A data processing apparatus having a memory for storing program code and a processor for processing the program code, the data processing apparatus comprising:
   a radio module to communicatively couple the data processing apparatus to a wireless network, the radio module configured to generate a plurality of debug data in a plurality of signal classes;
   a set of debug data filtering rules specifying a set of debug data within the plurality of signal classes to be collected from the radio module; and
   a debug application executed on the data processing apparatus, the debug application configured to apply the set of filtering rules, thereby causing only the specified set of debug data to be collected from the radio module, wherein the debug application is further configured to automatically communicate with a remote Web server to retrieve a new set of debug data filtering rules in response to a change in a network state connectivity of the data processing apparatus.

2. The data processing apparatus as in claim 1 wherein, after collection, the radio module is further configured to transmit the specified set of debug data to a service for evaluation.

3. The data processing apparatus as in claim 1 wherein the debug data filtering rules further specify one or more messaging entities within each of the plurality of signal classes.

4. The data processing apparatus as in claim 1 further comprising:
   debug filtering logic configured within the radio module to implement the debug data filtering rules to filter the specified set of debug data in response to the debug application.

5. The data processing apparatus as in claim 1 wherein the debug application is further configured to communicate with the remote Web server to retrieve the new set of debug data filtering rules in response to the data processing apparatus being booted.

6. The data processing apparatus as in claim 5 wherein, in response to a request for the new set of debug data filtering rules from the debug application, the remote Web server is configured to select between a set of default debug data filtering rules or a set of user- or device-specific debug data filtering rules.

7. The data processing apparatus as in claim 2 wherein, upon collecting the specified set of debug data, the debug application is further configured to cause the specified set of debug data to be packaged in an email message and transmitted to an email server on the service.

8. A method for collecting debug data from a data processing device comprising:
   providing a set of debug data filtering rules specifying a set of debug data within a plurality of signal classes to be collected from a radio module of a wireless data processing device;
   applying the set of debug data filtering rules to cause the specified set of debug data to be collected from the radio module; and
   automatically communicating with a remote Web server to retrieve a new set of debug data filtering rules in response to a change in a network state connectivity of the data processing device.

9. The method as in claim 8 further comprising:
   transmitting the specified set of debug data to a service for evaluation.

10. The method as in claim 8 wherein the debug data filtering rules further specify one or more messaging entities within each of the plurality of signal classes.

11. The method as in claim 8 wherein applying further comprises:

implementing the debug data filtering rules to filter the specified set of debug data generated by the radio module.

12. The method as in claim 8 further comprising:

communicating with the remote Web server to retrieve the new set of debug data filtering rules in response to the data processing device being booted.

13. The method as in claim 12 wherein, in response to a request for the new set of debug data filtering rules from the debug application, the remote Web server selects between a set of default debug data filtering rules or a set of user- or device-specific debug data filtering rules.

14. The method as in claim 9 wherein, upon collecting the specified set of debug data, the debug application causes the specified set to be packaged in an email message and transmitted to an email server on the service.

15. A machine-readable medium having program code stored thereon which, when executed by a machine, causes the machine to perform the operations of:

providing a set of debug data filtering rules specifying a set of debug data within a plurality of signal classes to be collected from a radio module of a wireless data processing device;

applying the set of debug data filtering rules to cause the specified set of debug data to be collected from the radio module; and automatically communicating with a remote Web server to retrieve a new set of debug data filtering rules in response to a change in a network state connectivity of the data processing device.

16. The machine-readable medium as in claim 15 comprising additional program code to cause the machine to perform the additional operations of:

transmitting the specified set of debug data to a service for evaluation.

17. The machine-readable medium as in claim 15 wherein the debug data filtering rules further specify one or more messaging entities within each of the plurality of signal classes.

18. The machine-readable medium as in claim 15 wherein applying further comprises:

implementing the debug data filtering rules to filter the specified set of debug data generated by the radio module.

19. The machine-readable medium as in claim 15 comprising additional program code to cause the machine to perform the additional operations of:

communicating with the remote Web server to retrieve the new set of debug data filtering rules in response to the data processing device being booted.

20. The machine-readable medium as in claim 19 wherein, in response to a request for the new set of debug data filtering rules from the debug application, the remote Web server selects between a set of default debug data filtering rules or a set of user- or device-specific debug data filtering rules.

21. The machine-readable medium as in claim 16 wherein, upon collecting the specified set of debug data, the debug application causes the specified set to be packaged in an email message and transmitted to an email server on the service.

* * * * *